United States Patent [19]

Ortner et al.

[11] 4,328,095
[45] May 4, 1982

[54] APPARATUS FOR REPROCESSING OLD PAPER

[75] Inventors: Herbert Ortner, Heidenheim; Werner Cechovsky, Herbrechtingen, both of Fed. Rep. of Germany

[73] Assignee: J. M. Voith GmbH, Heidenheim, Fed. Rep. of Germany

[21] Appl. No.: 232,604

[22] Filed: Feb. 9, 1981

[30] Foreign Application Priority Data

Feb. 16, 1980 [DE] Fed. Rep. of Germany ....... 3005815

[51] Int. Cl.³ .............................................. B03D 1/16
[52] U.S. Cl. .................... 209/169; 210/221.1
[58] Field of Search ............................. 209/168–170; 210/221.1, 221.2

[56] References Cited

U.S. PATENT DOCUMENTS

| 838,626 | 12/1906 | Kirby | 210/221.2 X |
| 1,389,674 | 9/1921 | Lyons et al. | 209/169 |
| 1,492,933 | 5/1924 | Parker | 209/169 |
| 1,578,274 | 3/1926 | Eldred et al. | 209/168 X |
| 3,050,188 | 8/1962 | Nisser et al. | 209/170 |
| 3,348,687 | 10/1967 | Foster | 210/221.1 X |
| 3,420,370 | 1/1969 | Isenhardt et al. | 209/169 |
| 3,446,353 | 5/1969 | Davis | 209/170 X |

FOREIGN PATENT DOCUMENTS

| 1517227 | 7/1975 | Fed. Rep. of Germany . | |
| 790099 | 11/1935 | France | 209/169 |
| 52-77176 | 1/1976 | Japan | 209/169 |
| 81512 | 9/1934 | Sweden | 209/169 |
| 695107 | 8/1953 | United Kingdom | 209/169 |

Primary Examiner—Ralph J. Hill
Attorney, Agent, or Firm—Albert L. Jeffers; John F. Hoffman

[57] ABSTRACT

Apparatus is provided for reprocessing old paper in a series of flotation cells arranged one behind another, the suspension discharge 11 from the front cell being connected to the suspension inlet 8 of the following cell, each cell being provided with a stirring impeller 3, an air infeed device 9 and a foam outlet opening 12. The cells are provided by a substantially tubular body 1 which is horizontal or slopes gradually downward towards the rear, the tubular body being divided into a plurality of sections by partition walls 2 extending substantially vertically. Each section is provided with a suspension inlet 8, a suspension discharge outlet 11, a foam outlet opening 12, a stirring impeller 3, and an air infeed device 9.

14 Claims, 4 Drawing Figures

APPARATUS FOR REPROCESSING OLD PAPER

BACKGROUND OF THE INVENTION

This invention generally relates to an apparatus for reprocessing old paper in a series of flotation cells arranged one behind another, in which the suspension discharge from the front cell is connected to the suspension inlet of the following flotation cell and each flotation cell is provided with a stirring member, an air inlet device and a foam discharge opening.

A flotation cell of this kind is, for example, disclosed in German Patent DE-AS No. 15 17 227. A disadvantage of such flotation cells is that the cells are in general open at the top and at least one open foam outlet is present. For this reason, damage to the environment may occur, the amount being dependent on the size and area of the container, the nature and state of the old paper to be treated. For this reason costly covers and/or costly room ventilation and room air discharge apparatus must be provided. Both expedients are very expensive. In addition, a flotation apparatus of this kind occupies considerable space, because in order to achieve suitable whiteness a relatively large number of cells arranged one behind the other is necessary.

SUMMARY OF THE INVENTION

The present invention is based on the problem of providing an apparatus of the above kind, which is less harmfull to the environment but can nevertheless be made cheaply and compactly.

Accordingly this invention provides apparatus for reprocessing old paper in a series of flotation cells arranged one behind another, in which in each case the suspension discharge from the front cell is connected to the suspension inlet of the following flotation cell and each flotation cell is provided with a stirring member, an air infeed device and a foam discharge opening, the cells being provided by a substantially tubular body which is horizontal or slopes gradually downwards towards the rear, the tubular body being subdivided into a plurality of sections by partition walls extending substantially vertically, and each section is provided with a suspension inlet, a suspension outlet, a foam outlet opening, a stirring member and an air infeed device.

The closed structure provided by the tubular body avoids or reduces damage to the environment and on the other hand satisfactory flotation effects and simple structure can be achieved by constructing the container as a tubular body. Also the form of the flow is very advantageous, and this has an advantageous action on the cleaning effect. A further advantage is that the flotation cells arranged one behind the other are very space-saving. Since they form a unit that is inherently stable, a plurality of cell units may also be arranged one above the other.

Therefore, one object of this invention is to provide an improved apparatus for reprocessing old paper.

Another object is to provide an intermediate wall within each tube section to separate the suspension outlet from the flotation chamber.

Another object is to provide an intermediate wall within each tube section that is formed substantially vertically in the lower region and curved towards the tube axis in the upper region.

Another object is to provide for the arrangement of a plurality of tubular bodies located one above the other.

Another object is to provide an elongated horizontally disposed tubular body having a substantially circular cross-sectional shape, in which a plurality of flotation cells are arranged one behind the other, in which the suspension discharge from one cell is connected to the suspension inlet of the following cell.

BRIEF DESCRIPTION OF THE DRAWINGS

The subject matter which we regard as our invention is particularly pointed out and distinctly claimed in the claims. The structure and operation of our invention, together with further objects and advantages, may be better understood from the following description given in connection with the accompanying drawing, in which:

DETAILED DESCRIPTION

The above-mentioned and other features and objects of this invention and the manner of attaining them will become more apparent and the invention itself will be best understood by reference to the following description of embodiments of the invention taken in conjunction with the accompanying drawings.

Figure 1:
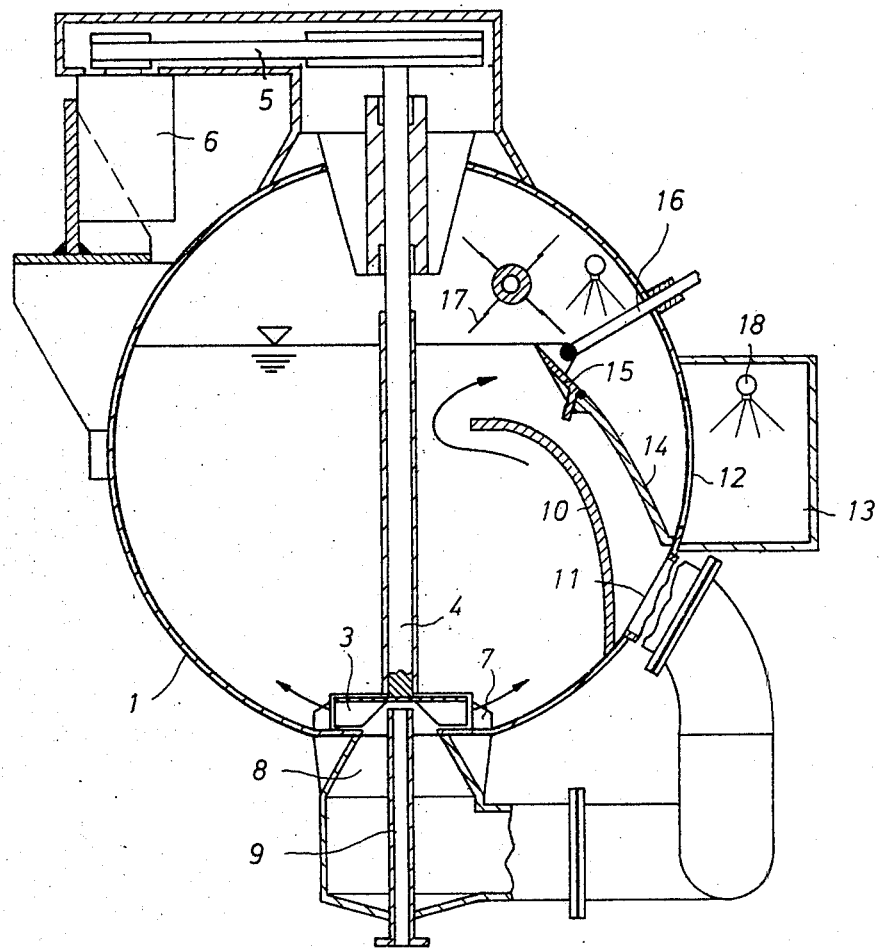
FIG. 1 is a cross-section through one embodiment of flotation apparatus according to the invention.
Figure 2:
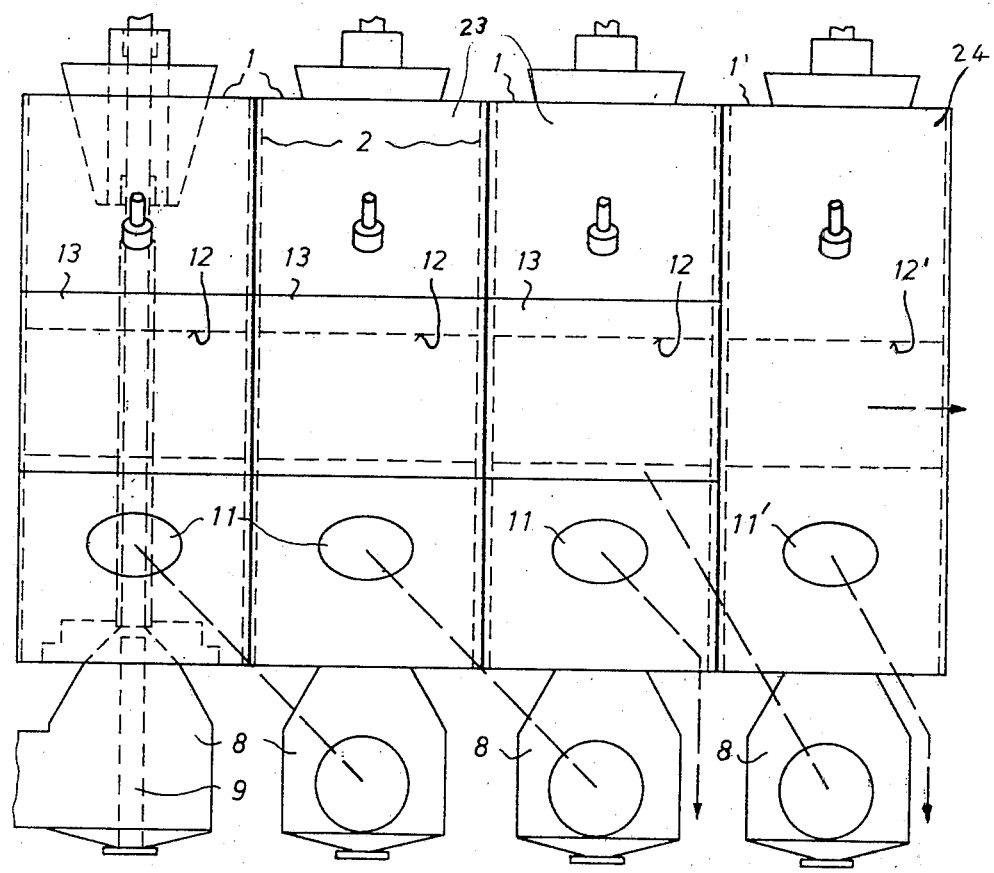
FIG. 2 is a side view of the flotation apparatus of FIG. 1.

As can be seen from FIGS. 1 and 2, the apparatus has a tubular body 1 which is divided by partition walls 2 into a plurality of sections. The term "tubular body" as used herein does not necessarily mean a circular tube, and some deviation from the circular form is possible. Thus for instance an elliptical cross-sectional shape is also possible.

In accordance with the invention the tubular body is arranged so as to be horizontal or so as to slope down gently towards the rear. A shape sloping gently downward towards the rear has the advantage that the flow is thereby improved. The tubular body may have a substantially circular cross-sectional shape.

For the sake of simplicity only a few cells are shown in FIG. 2. In each section a stirring impeller 3 is driven by way of a shaft 4 which is inserted from above through the tubular body 1. The shaft 4 is driven by a V-belt 5 and a motor 6, but there are of course other ways in which the shaft can be driven. Generally all the shafts 4 are driven from one driving means. Under the impeller 3, which is provided with a set of blades 7, there is a suspension inlet 8, through which the suspension to be floated enters the interior of the tube. Also, a small tube acting as an air infeed device 9 projects from below into the tubular body 1.

Each tube section may be provided laterally with an intermediate plate 10 which separates the suspension outlet from the flotation chamber. The intermediate wall may be formed substantially vertically in the lower region and be curved towards the tube axis in the upper region. Such a curved shape has the advantage that a satisfactory flow course is achieved. The flow is deflected at the top front edge of the intermediate plate 10 and flows in the direction of the flow outlet opening, so that a flow discharge blade wheel 17 may be dispensed with. That is to say, at the front inner edge of the intermediate plate 10, the flow is deflected in the direction towards the outer wall of the tube. Behind the intermediate plate 10 there is a suspension discharge outlet 11 in the side wall of the tubular body 1. Above the suspension discharge outlet 11 there is also a foam outlet opening 12 in each tube section 1, and behind this opening there is an adjacent foam channel 13 extending along the tubular body 1. The suspension discharge outlet 11 and the foam outlet opening 12 may be located on the same side wall.

In the embodiment according to FIG. 1, in each tube section there is a guide wall 14 with an overflow control valve 15 at the top end. The overflow control valve 15 is correspondingly adjusted by way of an adjusting device 16. The level in each tube section can be adjusted by way of the overflow control valve 15 in each tube section. A foam discharge blade wheel 17 is used for conveying the foam collecting on the surface.

A foam discharge blade wheel 17 may be used having blades 19 which are attached pivotally to arms of the foam discharge blade wheel 17, thereby saving space.

An overflow control valve 15 may be arranged at or in front of the foam outlet opening 12. If a stirring impeller 3 is used which has a constant throughput and the overflow control valve 15 is mounted slightly below the liquid level or is correspondingly adjusted, then a forced overflow is established. This expedient causes the foam to flow automatically in the direction of the flow discharge opening, whereby a flow discharge blade wheel 17 may be dispensed with. A common foam channel 13 may be arranged behind the foam outlet openings 12.

The overflow control valve 15 may be arranged at the foam outlet opening 12 to open into the common foam channel 13 arranged on the outer wall of the tubular body 1. If the overflow control valve 15 is so arranged that it opens outward, the treatment chamber for the suspension is somewhat increased still further. It is then only necessary to arrange cover plates 22 on both sides of the overflow control valve 15.

Foam spray nozzles 18 may be arranged in the foam channel 13. There may be a plurality of tubular bodies 1 arranged one above the other, and the individual tube sections are arranged one behind the other in series, forming primary 23 and/or secondary cells 24.

As can be seen more particularly from FIG. 2, each suspension discharge opening 11 is connected to the inlet opening 8 of the following flotation cell. In FIG. 2 only three primary cells 23 are shown, but any required cells may of course be arranged in series one behind another. The suspension emerging from the third flotation cell through the opening 11 is taken away as satisfactory material, whereas foam discharged through foam spraying nozzles 18 is fed from the foam channel 13 to one or more secondary cells 24 (only one is shown in FIG. 2) by way of the suspension inlet 8'. The suspension subsequently cleaned in this way is taken away by way of the outlet opening 11' for subsequent treatment. The foam emerging from the foam outlet opening 12' is slaked and condensed together with the impurities contained in this.

Figure 3:
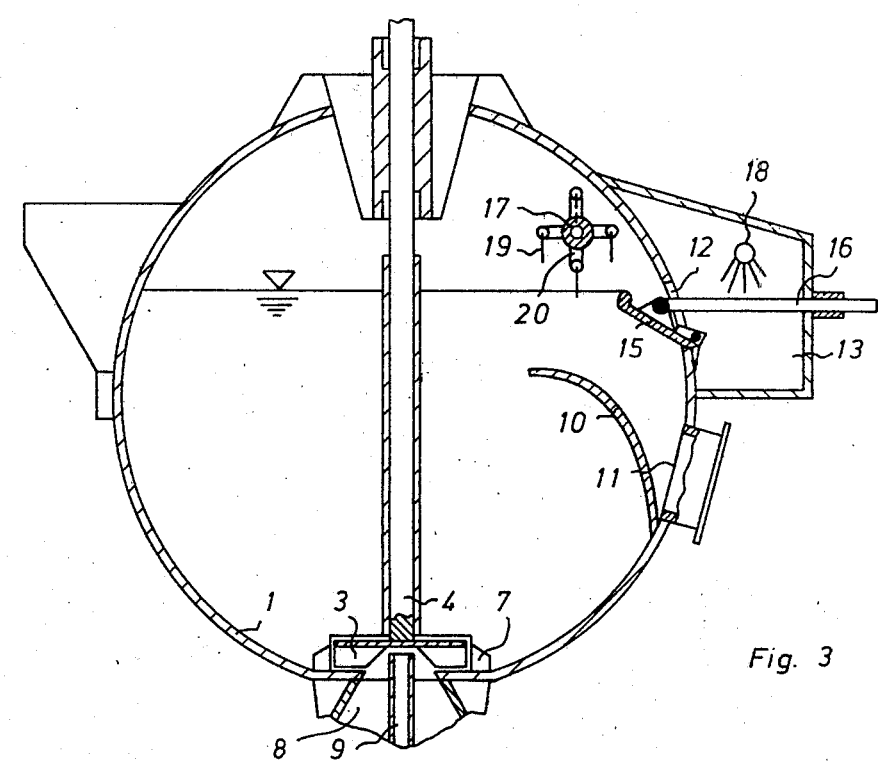
FIG. 3 is a cross-section through another embodiment of the invention.

The embodiment illustrated in FIG. 3 is substantially of the same structure, and therefore the same reference numerals are retained for the same parts. The essential difference in FIG. 3 from the embodiment of FIGS. 1 and 2 consists in the fact that the guide wall 14 is dispensed with. In this embodiment the overflow control valve 15 is arranged directly at the foam outlet opening 12.

Instead of rigid blades on the foam discharge blade wheel 17, hanging blades 19 are provided, which are pivotally attached to arms 20 of the foam discharge blade wheel 17. Because of this expedient, the blades 19 hang down because of their own weight, so that space is saved at the top. Instead of a blade wheel 17, in some cases one or more compressed air ducts 21 may be provided (FIG. 4) through which compressed air is blown into the interior of the tube, in order to drive the foam in the direction towards the foam outlet opening 12. The foam channel 13 may be located in the direction of the length of the tubular body 1, forming a closed unit together with the tubular body 1, thereby further contributing to provide an apparatus that is not harmful to the environment.

Figure 4:
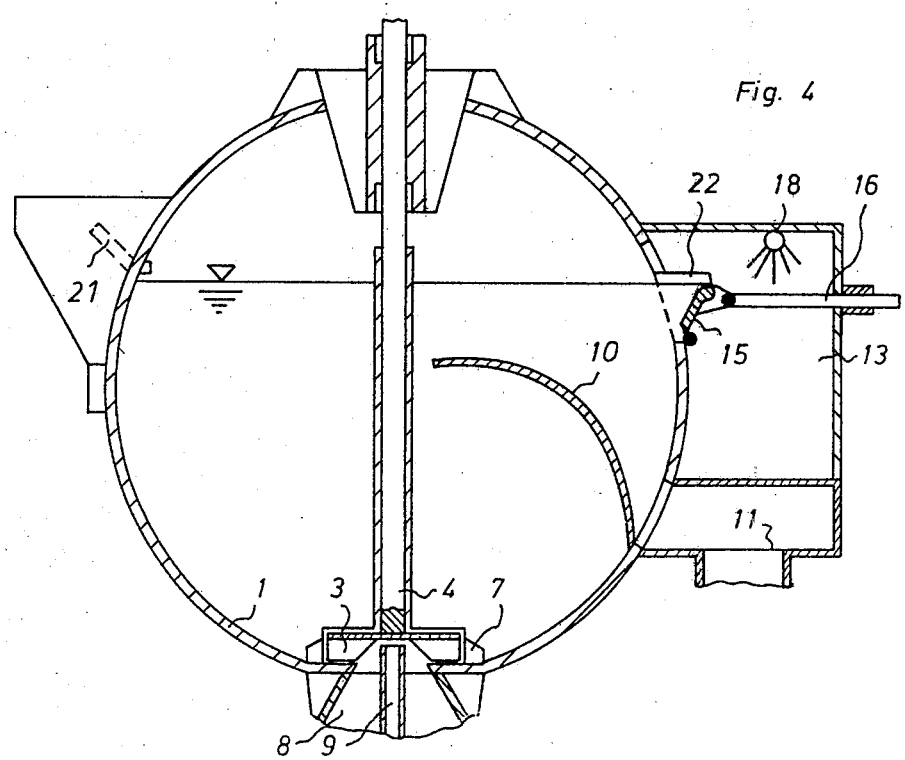
FIG. 4 is a cross-section through a further embodiment of the invention.

The embodiment illustrated in FIG. 4 is essentially of the same construction as the embodiments described previously. The essential difference is that the overflow control valve 15 is now arranged in the foam channel 13 or opens into the foam channel 13. For lateral covering each control valve 15 is provided with cover plates 22 on both sides. By this expedient the treatment space of each tube section is slightly extended into the foam channel 13.

The partition walls 2 can seal each chamber off from the other hermetically. In some cases, however, it may even be sufficient if the partition walls 2 are in each case only sufficiently high to ensure that they are higher than the highest possible liquid and foam level.

The invention is not restricted to the details of the foregoing embodiments. For instance, in the drawings the foam channel 13 is in each case arranged on the outer wall of the tube, but this is not essential and it is within the scope of the invention to locate the foam channel 13 inside the tubular body.

While the invention has been described with reference to particular embodiments, it is to be understood that modifications may be made without departing from the spirit of the invention or from the scope of the claims.

What I claim as new and desire to secure by Letters Patent of the United States is:

1. An apparatus for reprocessing old paper and the like which comprises:

a substantially elongated tubular body positioned generally horizontally;

a plurality of spaced generally vertical partition walls subdividing said tubular body into a plurality of sections forming a series of flotation cells within said tubular body arranged one behind the other;

a suspension inlet on each flotation cell;

a suspension discharge outlet on each cell adapted to receive the suspension discharge from that flotation cell and pass said suspension discharge to the suspension inlet of the adjacent flotation cell;

feeding means for introducing the suspension into each flotation cell;

air infeed means adapted to pass air into each flotation cell;

a foam discharge outlet opening adapted to discharge processed foam from each flotation cell;

each said flotation cell forming a single unitary flotation chamber; and an intermediate plate positioned within each of the unitary flotation chambers separating the suspension outlet from the flotation chamber, said plate having an edge forming with an inner surface of the body a large non-restrictive flow area directly above the inlet and between the suspension inlet and the suspension outlet.

2. An apparatus for reprocessing old paper and the like which comprises:

- a substantially elongated tubular body positioned generally horizontally;
- a plurality of spaced generally vertical partition walls subdividing said tubular body into a plurality of sections forming a series of flotation cells within said tubular body arranged one behind the other;
- a suspension inlet on each flotation cell;
- a suspension discharge outlet on each cell adapted to receive the suspension discharge from that flotation cell and pass said suspension discharge to the suspension inlet of the adjacent flotation cell;
- feeding means for introducing the suspension into each flotation cell;
- air infeed means adapted to pass air into each flotation cell;
- a foam discharge outlet opening adapted to discharge processed foam from each flotation cell;
- each said flotation cell forming a single unitary flotation chamber; and
- an intermediate plate positioned within each of the unitary flotation chambers separating the suspension outlet from the flotation chamber.

3. The apparatus of claim 2, including a compressed air duct positioned within each flotation cell near the foam outlet opening to aid foam discharge from each said flotation cell.

4. The apparatus of claim 2, wherein the elongated tubular body is of substantially circular cross-sectional shape.

5. The apparatus of claim 2, wherein each said intermediate plate has a substantially vertical lower region, and an upper region that is curved inwards towards the tubular body axis.

6. The apparatus of claim 2, wherein the suspension discharge outlet and the foam outlet opening are located on a common side wall of said tubular body.

7. The apparatus of claim 2, wherein an overflow control valve is positioned one of at and in front of the foam outlet opening.

8. The apparatus of claim 2, including a common foam channel connected to the foam outlets to receive the discharged processed foam from the foam outlet of each flotation cell.

9. The apparatus of claim 8, wherein an overflow control valve is positioned at each foam outlet opening and adapted to pass overflow into the common foam channel.

10. The apparatus of claim 9, including cover plates are positioned on both sides of said overflow control valve.

11. The apparatus of claim 8, including spray nozzles positioned within said common foam channel.

12. The apparatus of claim 8, wherein said foam outlet channel is located parallel to the elongated tubular body and is adapted to form a closed unit with said elongated tubular body.

13. The apparatus of claim 2, including a foam discharge blade wheel means adapted to rotate within each cell near the foam discharge outlet to aid foam discharge from said cell.

14. The apparatus of claim 13, including a plurality of secondary blades pivotally attached to the blades of the foam discharge blade wheel.

* * * * *